United States Patent
Laurent

(10) Patent No.: US 11,214,387 B2
(45) Date of Patent: Jan. 4, 2022

(54) ASSEMBLY METHOD FOR AN AIR INTAKE OF A JET ENGINE OF AN AIRCRAFT

(71) Applicant: Airbus Operations SAS, Toulouse (FR)

(72) Inventor: Jean-Noël Laurent, Bouguenais (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 164 days.

(21) Appl. No.: 16/781,139

(22) Filed: Feb. 4, 2020

(65) Prior Publication Data

US 2020/0262587 A1    Aug. 20, 2020

(30) Foreign Application Priority Data

Feb. 15, 2019   (FR) ...................................... 1901560

(51) Int. Cl.
| | |
|---|---|
| *B64F 5/10* | (2017.01) |
| *B33Y 80/00* | (2015.01) |
| *B64D 33/02* | (2006.01) |
| *F02C 7/045* | (2006.01) |

(52) U.S. Cl.
CPC ................ *B64F 5/10* (2017.01); *B64D 33/02* (2013.01); *F02C 7/045* (2013.01); *B33Y 80/00* (2014.12); *B64D 2033/0206* (2013.01); *F05D 2230/60* (2013.01)

(58) Field of Classification Search
CPC ... B64F 5/10; B64D 33/02; B64D 2033/0206; B64D 2033/0273; F02C 7/045; F02C 7/04; B33Y 80/00; F05D 2230/60; F05D 2230/31; F02M 35/00
See application file for complete search history.

(56) References Cited

U.S. PATENT DOCUMENTS

| | | | | |
|---|---|---|---|---|
| 5,581,054 A | * | 12/1996 | Anderson | ............... F02C 7/045 |
| | | | | 181/213 |
| 6,328,258 B1 | * | 12/2001 | Porte | ..................... B64D 33/02 |
| | | | | 244/53 B |
| 6,837,459 B2 | * | 1/2005 | Gonidec | ............... B64D 29/00 |
| | | | | 244/53 B |

(Continued)

FOREIGN PATENT DOCUMENTS

| | | |
|---|---|---|
| FR | 2868123 A1 | 9/2005 |
| FR | 3060651 A1 | 6/2018 |

OTHER PUBLICATIONS

French Search Report; priority document.

*Primary Examiner* — Lawrence Averick

(74) *Attorney, Agent, or Firm* — Greer, Burns & Crain, Ltd.

(57) ABSTRACT

An assembly method for an air intake of a jet engine of an aircraft, comprising providing an acoustic panel, an outside panel, flanges and a collar, arranging a rear edge of the acoustic panel on an assembly chassis. The flanges and the collar are attached at the rear edge of the acoustic panel. A rear edge of the outside panel is attached to the attached collar. A first set of geometric data of a front edge of the acoustic panel is measured and a second set of geometric data of a front edge of the outside panel is measured. A U-shaped lip as a single element is produced based on the two sets of geometric data. An inside leg of the lip is attached to the front edge of the acoustic panel and an outside leg of the lip is attached to the front edge of the outside panel.

3 Claims, 1 Drawing Sheet

(56) References Cited

U.S. PATENT DOCUMENTS

| Patent/Publication No. | Date | Name | Classification |
|---|---|---|---|
| 7,125,237 B2* | 10/2006 | Buge | B29C 53/824 425/182 |
| 7,383,679 B2* | 6/2008 | Porte | F02C 7/04 60/226.1 |
| 7,506,838 B2* | 3/2009 | Porte | F02C 7/04 244/53 B |
| 8,142,144 B2* | 3/2012 | Porte | F02C 7/04 415/200 |
| 8,220,588 B2* | 7/2012 | Thrash | F01D 21/045 181/292 |
| 8,584,363 B2* | 11/2013 | Caruel | F02C 7/045 29/897.2 |
| 8,607,452 B2* | 12/2013 | Crosta | F02K 3/06 29/889.2 |
| 9,403,599 B2* | 8/2016 | Binks | B64D 33/02 |
| 9,481,054 B2* | 11/2016 | Desjoyeaux | B29C 70/84 |
| 10,836,503 B2* | 11/2020 | Porte | F02C 7/047 |
| 2004/0000615 A1* | 1/2004 | Gonidec | B64D 29/00 244/53 B |
| 2004/0065775 A1* | 4/2004 | Buge | B29C 53/824 244/53 R |
| 2005/0269443 A1* | 12/2005 | Porte | F02C 7/04 244/53 B |
| 2005/0274103 A1* | 12/2005 | Prasad | B64D 33/02 60/226.1 |
| 2009/0290978 A1* | 11/2009 | Porte | F02C 7/04 415/200 |
| 2010/0107597 A1* | 5/2010 | Crosta | F02K 1/827 60/226.1 |
| 2011/0155855 A1* | 6/2011 | Caruel | B64D 33/02 244/134 D |
| 2011/0244150 A1* | 10/2011 | Thrash | F01D 21/045 428/34.1 |
| 2013/0312263 A1* | 11/2013 | Desjoyeaux | B23P 15/008 29/890.01 |
| 2014/0026974 A1* | 1/2014 | Desjoyeaux | B29D 99/001 137/15.1 |
| 2014/0064927 A1* | 3/2014 | Binks | B64D 29/08 415/119 |
| 2017/0292795 A1* | 10/2017 | Waissi | F01N 1/023 |
| 2018/0201387 A1* | 7/2018 | Porte | F02C 7/045 |
| 2019/0195128 A1* | 6/2019 | Diaz | B64D 33/08 |
| 2020/0070993 A1* | 3/2020 | Porte | F02C 7/047 |

* cited by examiner

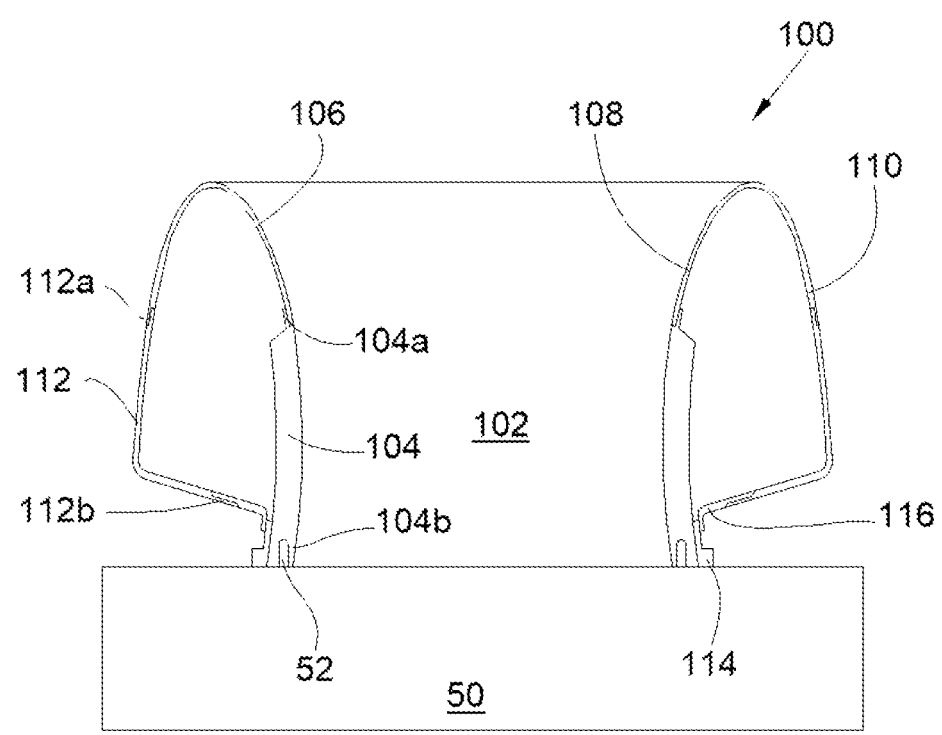

ASSEMBLY METHOD FOR AN AIR INTAKE OF A JET ENGINE OF AN AIRCRAFT

CROSS-REFERENCES TO RELATED APPLICATIONS

This application claims the benefit of the French patent application No. 1901560 filed on Feb. 15, 2019, the entire disclosures of which are incorporated herein by way of reference.

FIELD OF THE INVENTION

The present invention relates to an assembly method for an air intake of a jet engine of an aircraft, and to an air intake produced using such an assembly method.

BACKGROUND OF THE INVENTION

An air intake of a jet engine of an aircraft conventionally comprises a duct which is delimited by an acoustic panel which is positioned around the duct. The air intake also comprises a lip which constitutes the leading edge of the air intake and which extends the acoustic panel in the upstream direction, and an outside panel which constitutes the outside fairing of the air intake and which extends the lip on the outside.

The air intake also comprises a flange which is attached to the outside of the acoustic panel and a collar which is attached between the flange and the outside panel.

The lip consists of numerous elements which are attached to one another, resulting in considerable installation time and additional weight owing to the presence of the elements by means of which the elements are attached to one another.

It is therefore necessary to find an assembly method which facilitates the manufacture of such an air intake.

SUMMARY OF THE INVENTION

The present invention has an object of proposing an assembly method for an air intake of a jet engine of an aircraft, in which the method limits the number of steps required for complete assembly.

To that end, the invention proposes an assembly method for an air intake of a jet engine of an aircraft, the assembly method comprising:
- a provision step in which an acoustic panel, an outside panel, flanges and a collar are provided,
- a placing step in which a rear edge of the acoustic panel so provided is arranged on an assembly chassis,
- a first assembly step in which the flanges and the collar so provided are attached at the rear edge of the acoustic panel so placed,
- a second assembly step in which a rear edge of the outside panel so provided is attached to the collar so assembled,
- a measuring step which involves taking geometric data of a front edge of the acoustic panel and geometric data of a front edge of the outside panel,
- a manufacturing step in which a U-shaped lip is produced as a single element on the basis of the geometric data so taken, and
- a third assembly step in which an inside leg of the lip so produced is attached to the front edge of the acoustic panel and in which an outside leg of the lip so produced is attached to the front edge of the outside panel.

An assembly method of this kind makes it possible to limit the steps by using a lip consisting of a single element.

Advantageously, the assembly chassis comprises a plurality of guiding studs, the rear edge of the acoustic panel comprises a bore for each guiding stud and the placing step comprising accommodating a guiding stud in each bore.

Advantageously, the manufacturing step comprises additive manufacturing 3D printing.

The invention also proposes an air intake of a jet engine of an aircraft, the air intake being created according to an assembly method according to one of the preceding variants, where the air intake delimits a duct and comprises:
- an acoustic panel around the duct, where the acoustic panel has a front edge and a rear edge,
- an outside panel around the acoustic panel, where the outside panel has a front edge and a rear edge,
- flanges attached around and to the outside of the acoustic panel at the rear edge of the acoustic panel,
- a collar attached between the flange and the rear edge of the outside panel, and
- a lip which consists of a single U-shaped element, of which an inside leg extends the front edge of the acoustic panel in the upstream direction and of which an outside leg extends the front edge of the outside panel in the upstream direction.

BRIEF DESCRIPTION OF THE DRAWINGS

The above-mentioned features of the invention, along with others, will become more clearly apparent on reading the following description of one exemplary embodiment, the description being given with reference to the appended drawings, in which:

The FIGURE is a view in section of an air intake according to the invention.

DETAILED DESCRIPTION OF THE PREFERRED EMBODIMENTS

The FIGURE shows an air intake 100 of a jet engine of an aircraft. The air intake 100 is arranged on an assembly chassis 50 which serves to hold the air intake 100 as it is assembled.

The air intake 100 delimits a duct 102. The air intake 100 comprises an acoustic panel 104 which is positioned around the duct 102 and an outside panel 112 which is positioned around the acoustic panel 104 and constitutes the outside fairing of the air intake 100.

The acoustic panel 104 and the outside panel 112 each have a generally cylindrical shape.

The acoustic panel 104 has a front edge 104a which projects forwards and a rear edge 104b which projects rearwards.

The outside panel 112 has a front edge 112a which projects forwards and a rear edge 112b which projects rearwards.

The air intake 100 also comprises flanges 114 which are attached around and to the outside of the acoustic panel 104, at the rear edge 104b of the acoustic panel 104.

The air intake 100 also comprises a collar 116 which is attached between the flange 114 and the rear edge 112b of the outside panel 112.

The air intake 100 also comprises a lip 106 which consists of a single element and which constitutes the leading edge of the air intake 100. The lip 106 is U-shaped, of which an inside leg 108 extends the front edge 104a of the acoustic panel 104 in the upstream direction and of which an outside leg 110 extends the front edge 112a of the outside panel 112 in the upstream direction. The lip 106 is made of a single material.

An assembly method for the air intake 100 comprises:
- a provision step in which an acoustic panel 104, an outside panel 112, flanges 114 and a collar 116 are provided,
- a placing step in which the rear edge 104b of the acoustic panel 104 so provided is arranged on the assembly chassis 50,
- a first assembly step in which the flanges 114 and the collar 116 so provided are attached at the rear edge 104b of the acoustic panel 104 so placed,
- a second assembly step in which the rear edge 112b of the outside panel 112 so provided is attached to the collar 116 so assembled,
- a measuring step which involves taking the geometric data of the front edge 104a of the acoustic panel 104 and the geometric data of the front edge 112a of the outside panel 112,
- a manufacturing step in which the lip 106 is produced as a single element on the basis of the geometric data so taken, and
- a third assembly step in which the inside leg 108 of the lip 106 so produced is attached to the front edge 104a of the acoustic panel 104 and in which the outside leg 110 of the lip 106 so produced is attached to the front edge 112a of the outside panel 112.

An assembly method of this kind thus permits better integration of the lip 106 in its environment, and an improvement in terms of handling. In a preferred embodiment, no additional assembly steps are required for the air intake 100.

The assembly chassis 50 comprises a plurality of guiding studs 52, the rear edge 104a of the acoustic panel 104 comprises a bore for each guiding stud 52 and the placing step comprising accommodating a guiding stud 52 in each bore. Such an arrangement makes it possible to ensure the position of the acoustic panel 104 for the subsequent steps.

The measuring step comprises taking the geometric data relating to the front edge 104a of the acoustic panel 104 and to the front edge 112a of the outside panel 112. These data are taken, for example, by scanning the edges 104a and 112a. Such a scan is carried out, for example, using a camera together with appropriate software which makes it possible to determine the geometric data from the images recorded by the camera.

The manufacturing step comprises additive manufacturing 3D printing, for example using titanium alloys or aluminum alloys, or using polymer materials. 3D printing of this kind makes it possible to obtain particularly advantageous results, but other methods are conceivable, such as sand casting or shell casting, spark erosion finished by machining of the grinding type.

The various assembly steps are carried out using attachment means known to a person skilled in the art and already employed in the prior art, such as threaded elements.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly method for an air intake of a jet engine of an aircraft, comprising:
   providing an acoustic panel, an outside panel, flanges and a collar,
   arranging a rear edge of the acoustic panel on an assembly chassis,
   attaching the flanges and the collar at the rear edge of the acoustic panel,
   attaching a rear edge of the outside panel to the attached collar,
   measuring a first set of geometric data of a front edge of the acoustic panel and a second set of geometric data of a front edge of the outside panel,
   producing a U-shaped lip as a single element based on said two sets of geometric data, and
   attaching an inside leg of the lip to the front edge of the acoustic panel and attaching an outside leg of the lip to the front edge of the outside panel.

2. The assembly method according to claim 1, wherein the assembly chassis comprises a plurality of guiding studs,
   wherein the rear edge of the acoustic panel comprises a bore for each guiding stud, and
   wherein the arranging step comprises accommodating one of the plurality of guiding studs in each bore.

3. The assembly method according to claim 1, wherein the producing step comprises additive manufacturing 3D printing.

* * * * *